United States Patent
Qiao et al.

(10) Patent No.: US 9,453,782 B2
(45) Date of Patent: Sep. 27, 2016

(54) DETECTION OF AIR-FUEL RATIO RICH-LEAN IMBALANCE USING AN OXYGEN SENSOR

(71) Applicant: Continental Automotive Systems, Inc., Auburn Hills, MI (US)

(72) Inventors: Ningsheng Qiao, Troy, MI (US); Chandrasekar Krishnamuthy, Canton, MI (US); David Frankowski, Monroe, MI (US); Michael Kalich, Sterling Heights, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 344 days.

(21) Appl. No.: 14/323,373

(22) Filed: Jul. 3, 2014

(65) Prior Publication Data

US 2016/0003710 A1    Jan. 7, 2016

(51) Int. Cl.
| | | |
|---|---|---|
| *G01M 15/10* | (2006.01) | |
| *F02D 41/14* | (2006.01) | |
| *F02D 41/22* | (2006.01) | |

(52) U.S. Cl.
CPC ........ *G01M 15/104* (2013.01); *F02D 41/1454* (2013.01); *F02D 41/22* (2013.01); *F01N 2560/025* (2013.01); *F02D 2041/1432* (2013.01)

(58) Field of Classification Search
CPC ................. F01N 2560/025; F02D 2041/1432; F02D 41/1454; F02D 41/22; F02D 41/0085; G01M 15/104; F02M 65/00
USPC ........................................................ 73/114.72
See application file for complete search history.

(56) References Cited

U.S. PATENT DOCUMENTS

| | | | | |
|---|---|---|---|---|
| 7,802,563 B2 * | 9/2010 | Behr | ................... | F02D 41/0082 123/692 |
| 7,900,615 B2 * | 3/2011 | Wang | ................... | F02D 41/0085 123/672 |
| 8,447,497 B2 * | 5/2013 | Iwazaki | .............. | F02D 41/0042 123/516 |
| 8,577,645 B2 * | 11/2013 | Turin | ................... | F02D 41/0085 702/183 |
| 8,694,226 B2 * | 4/2014 | Kurahashi | ........... | F02D 41/0085 701/103 |
| 9,217,383 B2 * | 12/2015 | Bagnasco | ........... | F02D 41/0085 |
| 9,399,961 B2 * | 7/2016 | Lehmen | .............. | F02D 41/1444 |

* cited by examiner

*Primary Examiner* — Freddie Kirkland, III (57) ABSTRACT

A system and method for detecting air-fuel ratio rich-lean imbalance in an automotive engine cylinder is provided. The system and the method are configured to receive an oxygen sensor voltage of an oxygen sensor. They also include filtering the oxygen sensor voltage to create a filtered oxygen sensor voltage. An engine speed and load are determined, and an air-fuel ratio imbalance detection threshold is determined based on the engine speed and the engine load. A rich-lean imbalance status is determined, the rich-lean imbalance status being non-normal if any portion of the filtered oxygen sensor voltage exceeds the air-fuel ratio imbalance detection threshold, and the rich-lean imbalance status being normal if none of the filtered oxygen sensor voltage exceeds the air-fuel ratio imbalance detection threshold. An engine control unit having several control logics to execute similar steps is also provided.

20 Claims, 9 Drawing Sheets

DETECTION OF AIR-FUEL RATIO RICH-LEAN IMBALANCE USING AN OXYGEN SENSOR

TECHNICAL FIELD

The present disclosure relates to air-fuel ratio imbalance detection in an automotive engine, and more particularly, to a method, system, and controller for non-intrusive detection of the rich-lean status of the air-fuel ratio imbalance in a cylinder of an automotive engine.

BACKGROUND

Air-fuel ratio cylinder imbalance is a condition in which the air-fuel ratio in one or more cylinders is different than the other cylinders. Air-fuel ratio cylinder imbalance may occur as a result of a cylinder specific malfunction, such as an intake manifold leak at a particular cylinder, a fuel injector malfunction, an individual cylinder exhaust gas recirculation (EGR) valve runner flow delivery abnormality, an individual variable cam life malfunction and/or erroneous cam lift profile, or other malfunctions that will cause improper distribution of intake air or fuel to the engine.

When air-fuel ratio cylinder imbalance occurs in one or more cylinders, the fuel delivery system is unable to maintain a proper vehicle emission level. In addition, vehicle data has shown that the impact of tailpipe emissions due to air-fuel ratio cylinder imbalance varies depending on whether there is an air-fuel ratio cylinder rich imbalance or an air-fuel ratio cylinder lean imbalance. Vehicle on-board diagnostics are required to detect air-fuel ratio cylinder imbalance levels that cause the fuel delivery system to become unable to maintain vehicle emissions at or below 1.5 times any of the applicable Federal Test Procedure (FTP) standards.

Existing systems use intrusive monitoring to differentiate between rich and lean cylinder imbalance malfunction. Fueling is shifted for each cylinder individually to determine whether the cylinder(s) is running rich or lean during the monitoring event. As such, tailpipe emissions increase during monitoring. Any failure event is typically counted by a fail counter and a de-bounce counter.

Government regulations and consumer desires demand that vehicles continuously improve on fuel economy and emissions. At the same time, vehicle affordability is a concern, in light of the numerous automotive requirements and increasing costs. Accordingly, there is a need for more fuel efficient and low-emission engines that are also without added complexity and cost.

SUMMARY

Disclosed is a system and method for detecting air-fuel ratio rich-lean imbalance in an automotive engine cylinder, which may be both non-intrusive and without added complexity or additional hardware. For example, the system can be used to determine rich/lean imbalance status based on engine velocity and oxygen sensor signal. No intrusive fuel imbalance is needed to determine the air-fuel ratio cylinder imbalance, making the system useful for fuel systems that are not controlled individually on each cylinder, additionally, by eliminating an intrusive test, improvements on the fuel economy and emissions impact of monitoring are possible.

In one form, which may be combined with or separate from the other forms described herein, a method for detecting air-fuel ratio rich-lean imbalance in an automotive engine cylinder is provided. The method includes receiving an oxygen sensor voltage of an oxygen sensor and filtering the oxygen sensor voltage to create a filtered oxygen sensor voltage. The method further includes determining an engine speed and an engine load and determining an air-fuel ratio imbalance detection threshold, based on the engine speed and the engine load. The method also includes determining a rich-lean imbalance status, wherein the rich-lean imbalance status is non-normal if any portion of the filtered oxygen sensor voltage exceeds the air-fuel ratio imbalance detection threshold, and the rich-lean imbalance status is normal if none of the filtered oxygen sensor voltage exceeds the air-fuel ratio imbalance detection threshold.

In another form, which may be combined with or separate from the other forms described herein, an engine control unit is provided that is configured to detect an air-fuel ratio rich-lean imbalance in an automotive engine cylinder. The engine control unit includes a first control logic configured to receive an oxygen sensor voltage of an oxygen sensor and a second control logic configured to filter the oxygen sensor voltage to create a filtered oxygen sensor voltage. The engine control unit also includes a third control logic configured to determine an engine speed and an engine load. In addition, the engine control unit includes a fourth control logic configured to determine an air-fuel ratio imbalance detection threshold, based on the engine speed and the engine load. A fifth control logic is configured to determine a rich-lean imbalance status. The rich-lean imbalance status is non-normal if any portion of the filtered oxygen sensor voltage exceeds the air-fuel ratio imbalance detection threshold, and the rich-lean imbalance status is normal if none of the filtered oxygen sensor voltage exceeds the air-fuel ratio imbalance detection threshold.

In yet another form, which may be combined with or separate from the other forms described herein, a system for detecting air-fuel ratio rich-lean imbalance in an automotive engine cylinder is provided. The system includes an oxygen sensor, a controller configured to receive an oxygen sensor voltage of the oxygen sensor, and an order based filter configured to filter the oxygen sensor voltage to create a filtered oxygen sensor voltage. The controller is configured to receive the filtered oxygen sensor voltage from the filter, and the controller is configured to determine an air-fuel ratio imbalance detection threshold based on an engine speed and an engine load. The controller is configured to determine a rich-lean imbalance status, wherein the rich-lean imbalance status is non-normal if any portion of the filtered oxygen sensor voltage exceeds the air-fuel ratio imbalance detection threshold, and the rich-lean imbalance status is normal if none of the filtered oxygen sensor voltage exceeds the air-fuel ratio imbalance detection threshold.

Further features and advantages of the present disclosure will become apparent from consideration of the following description and the appended claims, when taken in connection with the accompanying drawings. It should be understood that the description and specific examples are intended for purposes of illustration only and are not intended to limit the scope of the present disclosure.

BRIEF DESCRIPTION OF THE DRAWINGS

Examples are reflected in the drawings, which will be described below. The drawings described herein are for illustration purposes only and are not intended to limit the scope of the present disclosure in any way. The drawings show.

DETAILED DESCRIPTION

The following description is merely exemplary in nature and is not intended to limit the present disclosure, application, or uses.

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ".

Examples of the invention are described below. It should be noted that these and other examples or embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art. Other embodiments may be utilized, and other changes may be made, without departing from the spirit or scope of the subject matter presented here.

Figure 1:
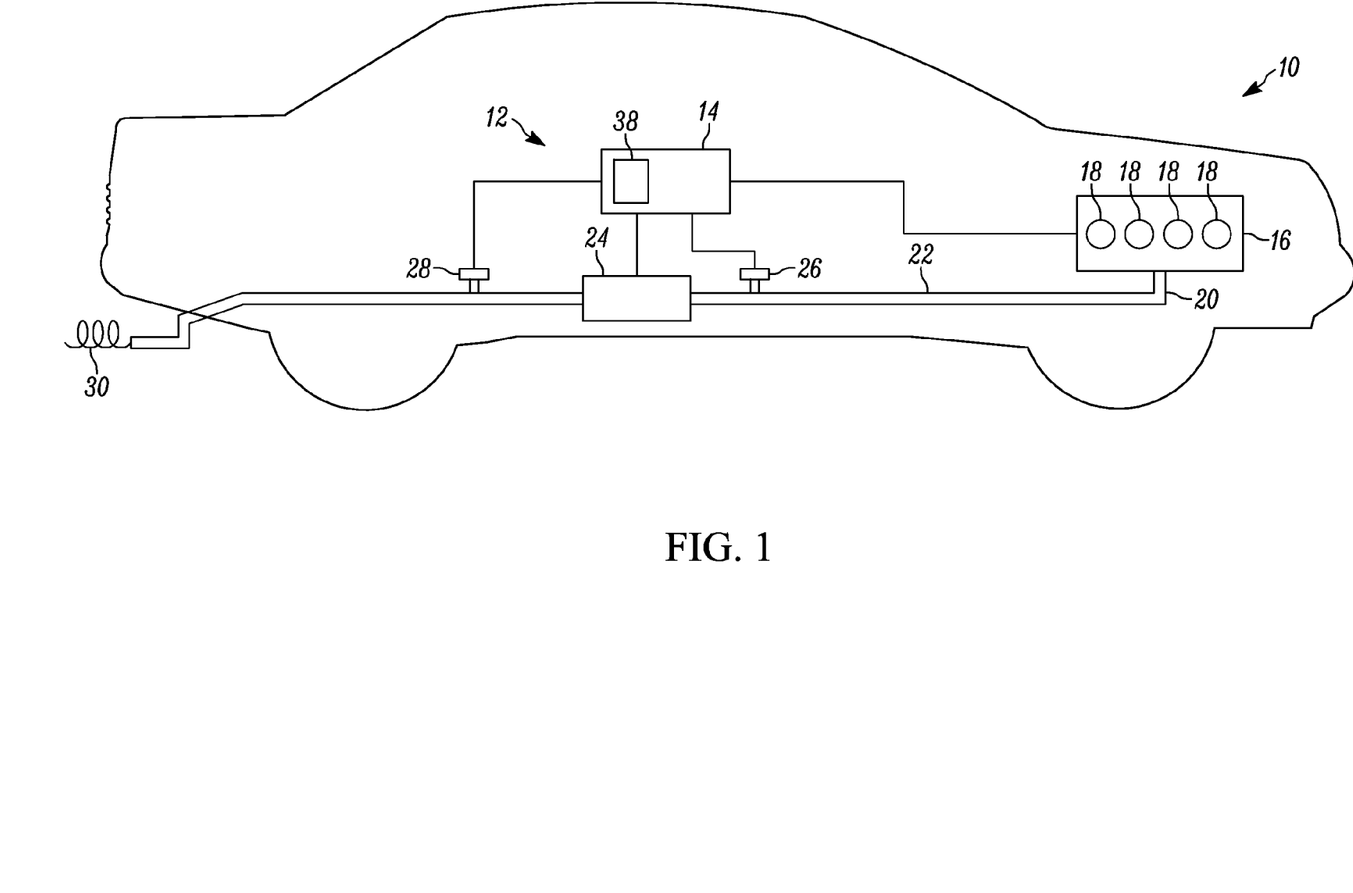
FIG. 1 is schematic side view of a motor vehicle having a system for detecting air-fuel ratio rich-lean imbalance, according to the principles of the present disclosure.

With reference to FIG. 1, a motor vehicle is schematically illustrated and generally designated at 10. The vehicle 10 includes a system 12 for detecting air-fuel ratio rich-lean imbalance in an automotive engine cylinder, in accordance with the principles of the present disclosure. The system 12 includes a vehicle controller, such as an engine control unit (ECU) 14, which is in communication with the vehicle engine 16. The engine 16 may have any number of cylinders 18, and the engine 16 has an exhaust outlet 20. The cylinders 18, together with pistons (not shown), form combustion chambers in each of the cylinders 18. One or more fuel injectors (not shown) are configured to supply an air-fuel mixture into the combustion chambers, which is compressed by the pistons to combust and power the vehicle 10.

After combustion occurs, the air-fuel mixture turns into an exhaust gas and is exhausted from the cylinders 18 into the exhaust outlet 20 and the exhaust line 22. The exhaust gas may then be treated by a catalytic converter 24 in the exhaust line 22. The exhaust line 22 may include an oxygen sensor 26 upstream of the catalytic converter 24, and another oxygen sensor 28 downstream of the catalytic converter 24, by way of example. The oxygen sensors 26, 28 may be binary switching sensors or any other suitable type of oxygen sensors 26, 28. Exhaust 30 is expelled from the exhaust line 22 downstream of the oxygen sensors 26, 28 and the catalytic converter 24.

Figure 2:
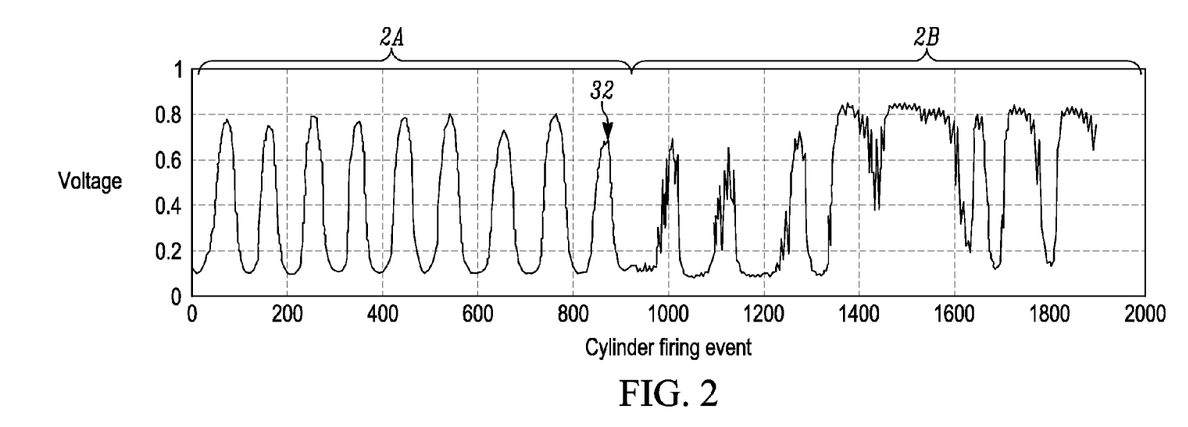
FIG. 2 is a graph illustrating the oxygen sensor voltage of an oxygen sensor over a series of cylinder firing events, wherein a lean air-fuel mixture is used after about the $920^{th}$ firing event, in accordance with the principles of the present disclosure.

The engine control unit 14 supplies a reference voltage and ground to the oxygen sensors 26, 28 and receives the output voltages from the oxygen sensors 26, 28. In the present disclosure, the engine control unit 14 is configured to receive the oxygen sensor voltage of the upstream oxygen sensor 26. For example, a voltage is supplied to the upstream oxygen sensor 26, and the engine control unit 14 is configured to receive and determine the oxygen sensor voltage state for each engine firing event. More particularly, oxygen sensor voltage signals may be sampled every engine firing event, and stored in a data buffer. An example of the oxygen sensor voltage 32 is shown in FIG. 2. Between the $800^{th}$ and $1000^{th}$ cylinder firing event (starting at about the $920^{th}$ firing event), a 20% lean air-fuel mixture offset has been induced into one cylinder. As can be seen, the voltage 32 differs in part 2B, after the lean induction, and appears different than in part 2A, before the lean induction.

Figure 3:
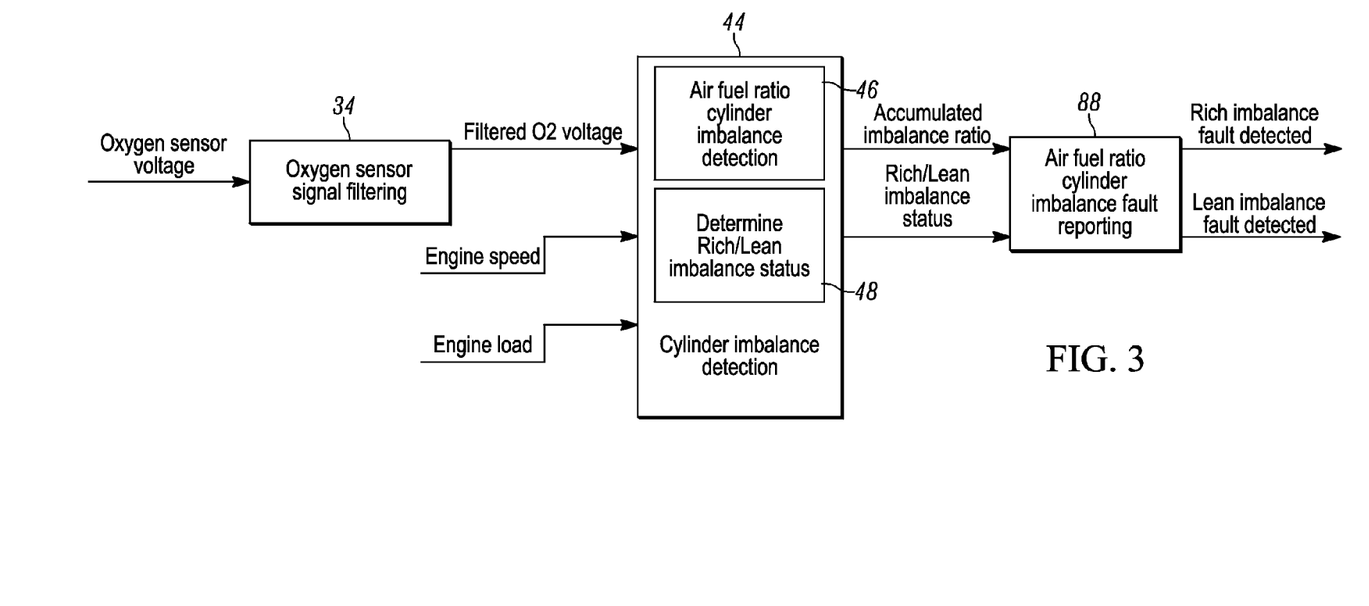
FIG. 3 is a block diagram illustrating an overview of the system for detecting air-fuel ratio rich-lean imbalance in an automotive engine cylinder of FIG. 1, according to the principles of the present disclosure.

Referring now to FIG. 3, an overview of the system 12 for detecting air-fuel ratio rich-lean imbalance in an automotive engine cylinder is illustrated having three functional blocks. In a first block 34, the engine control unit 14 (or other controller) receives the oxygen sensor voltage and filters the oxygen sensor voltage. For example, the engine control unit 14 may have a control logic configured to receive the oxygen sensor voltage of an oxygen sensor, such as upstream oxygen sensor 26, and a control logic configured to filter the oxygen sensor voltage to create a filtered oxygen sensor voltage.

Figure 4:
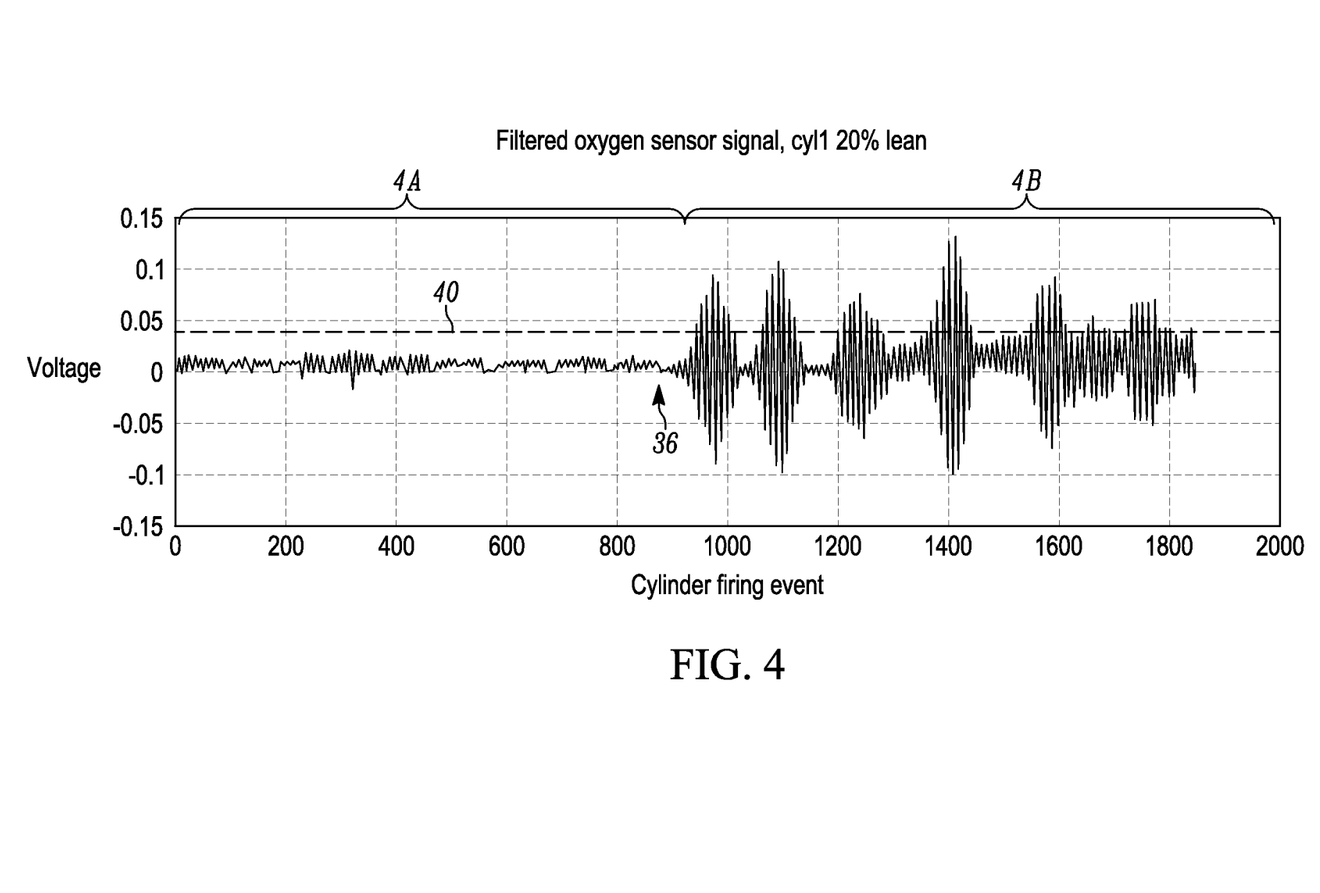
FIG. 4 is a graph illustrating the filtered oxygen sensor voltage of the oxygen sensor of FIG. 2, in accordance with the principles of the present disclosure.

Referring to FIG. 4, an example of the filtered oxygen sensor voltage 36 is shown. The oxygen sensor voltage 32 of FIG. 2 has been filtered to create the filtered oxygen sensor voltage 36 of FIG. 4. Thus, between the $800^{th}$ and 1000' cylinder firing event (starting at about the $920^{th}$ firing event), a 20% lean air-fuel mixture offset has been induced into one cylinder. As can be seen, the filtered voltage 36 differs in part 4B, after the lean induction, and appears different than in part 4A, before the lean induction. The system 12 may include a digital order based filter 38 (see FIG. 1), such as an order based finite impulse response (FIR) filter, that is configured to filter the oxygen sensor voltage 32 to create the filtered oxygen sensor voltage 36. The order based filter 38 may be included within the ECU 14 housing, or located outside of the ECU 14 housing. The filter 38 may be a band-pass filter, by way of example. The filter 38 may be independent of speed and load of the engine 16.

As can be seen in FIG. 4, the digital filter 38 attenuates the normal oxygen sensor voltage signal 32 (as seen in FIG. 2), and intensifies the lean imbalance voltage signal. Accordingly, the ECU 14 can determine whether the filtered voltage signal 36 exceeds a threshold 40. The threshold 40 has been determined by a calibration, and is based on engine speed and load, which will be described in further detail below.

Figure 5:
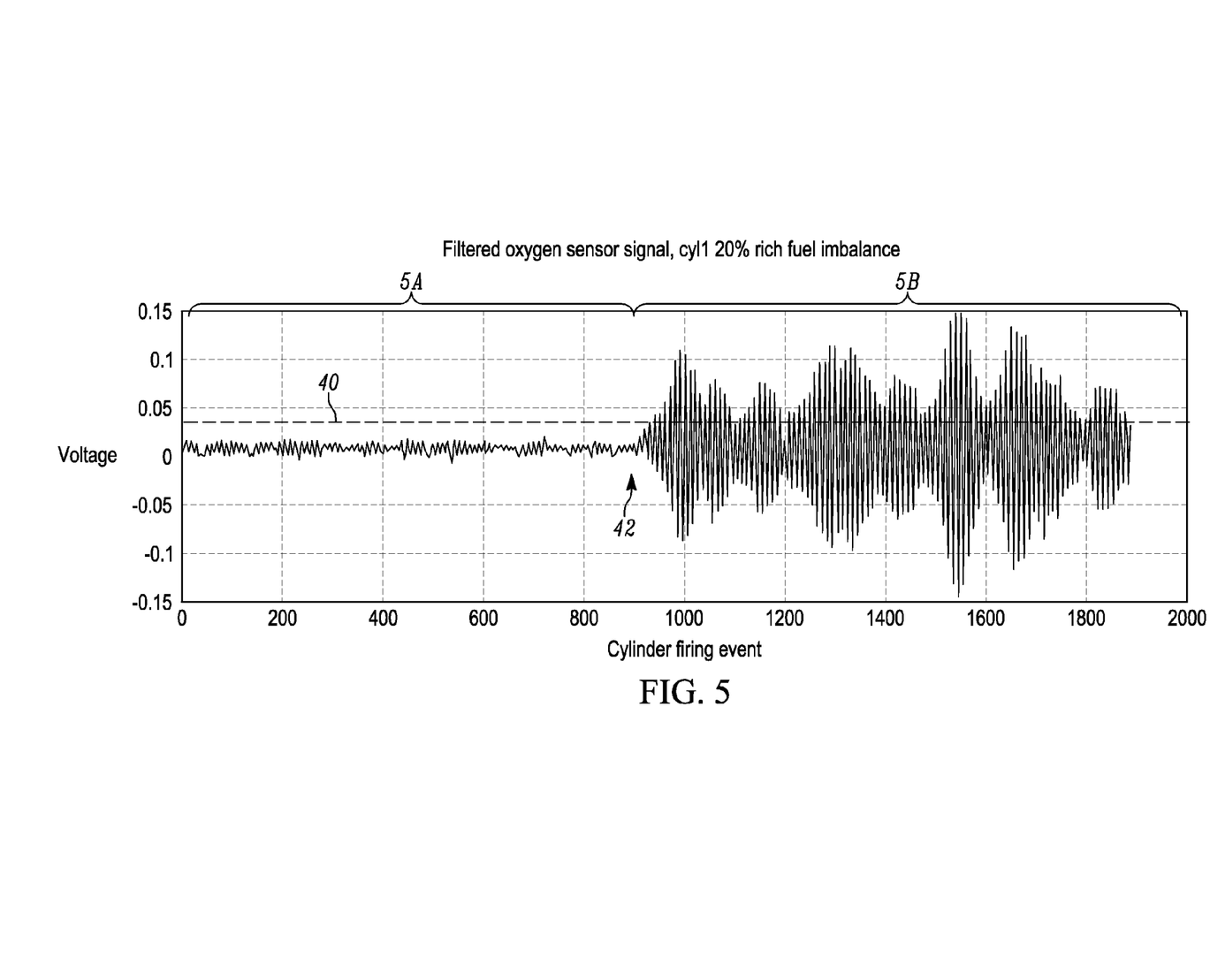
FIG. 5 is a graph illustrating the filtered oxygen sensor voltage of an oxygen sensor over a series of cylinder firing events, wherein a rich air-fuel mixture is used after about the $930^{th}$ firing event, according to the principles of the present disclosure.

Referring now to FIG. 5, an example of a filtered oxygen sensor voltage 42 having a portion wherein a 20% rich air-fuel mixture offset has been induced into one cylinder. Between the $800^{th}$ and $1000^{'}$ cylinder firing event (starting at about the $930^{th}$ firing event), a 20% rich air-fuel mixture offset has been induced into one cylinder. As can be seen, similar to the lean-induced filtered voltage 36, the filtered voltage 42 in FIG. 5 having a rich-induced section differs in part 5B, after the rich induction, and appears different than in part 5A, before the rich induction. The voltage signal 42 in FIG. 5 has been filtered by the order based filter 38. The digital filter 38 has attenuated a non-filtered oxygen sensor voltage signal having a rich-induced section (not shown), and has intensified the rich imbalance voltage signal as shown in part 5B. Accordingly, the ECU 14 can determine whether the filtered voltage signal 42 exceeds the threshold 40.

Referring back to FIG. 2, in a second functional block 44, cylinder imbalance is detected. The second functional block 44 includes sub-functions 46, 48 for detecting air fuel ratio cylinder imbalance and determining rich/lean imbalance status. First, the system 12 is configured to detect cylinder imbalance and/or to determine an imbalance status in sub-function 44. That is, the system 12 can determine whether the fuel mixture balance is normal or non-normal in sub-function 46 and whether the imbalance is rich or lean in sub-function 48. The ECU 14 is configured to receive the filtered oxygen sensor voltage (for example, 36 or 42, or any other filtered voltage) from the filter 38.

The ECU 14 may have a control logic configured to determine an engine speed and an engine load. The ECU 14 is configured to determine an air-fuel ratio imbalance detection threshold, such as threshold 40, based on an engine speed and an engine load. For example, the system 12 is pre-calibrated as a function of engine speeds and loads as to what the threshold 40 should be. Thus, the ECU 14 may have a control logic configured to determine an air-fuel ratio imbalance detection threshold, based on the engine speed and the engine load.

The ECU 14 is configured to determine a rich-lean imbalance status. Thus, the ECU 14 may have a control logic configured to determine a rich-lean imbalance status. The rich-lean imbalance status is determined to be non-normal if any portion of the filtered oxygen sensor voltage exceeds the air-fuel ratio imbalance detection threshold, and the rich-lean imbalance status is determined to be normal if none of the filtered oxygen sensor voltage exceeds the air-fuel ratio imbalance detection threshold. The filtered oxygen sensor voltage may be compared to the threshold for a single engine cycle or multiple engine cycles, by way of example, which will be explained in more detail below.

Figure 6:
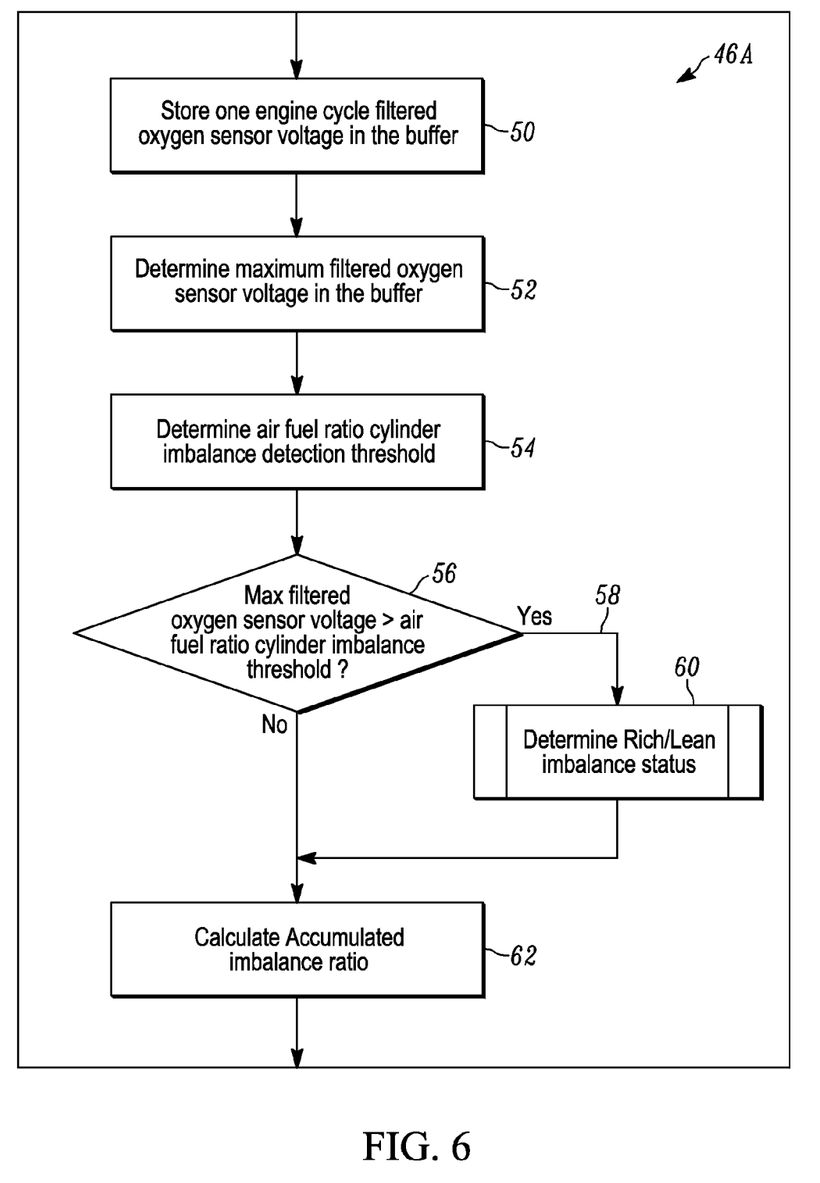
FIG. 6 is a block diagram illustrating an example of a sub-function for determining a rich-lean imbalance status of the system illustrated in FIG. 3, in accordance with the principles of the present disclosure.

Referring now to FIG. 6, one example 46A of how the sub-function 46 may detect rich-lean imbalance is illustrated. The ECU 14 may store a single engine cycle of filtered oxygen sensor voltage in a buffer, as illustrated in functional box 50. Next, the ECU 14 may be configured to determine a maximum oxygen sensor filtered voltage from the filtered oxygen sensor voltage of the single engine cycle, as illustrated in functional box 52. Thus, the ECU 14 may include a control logic configured to determine a maximum oxygen sensor filtered voltage from the filtered oxygen sensor voltage, for one or more engine cycles, by way of example.

As described above, the ECU 14 may be configured to determine an air-fuel ratio imbalance detection threshold, based on engine speed and load. Such a determination is illustrated in functional box 54. Referring now to functional box 56, the ECU 14 may determine the rich-lean imbalance status by determining whether the maximum oxygen sensor filtered voltage exceeds the air-fuel imbalance detection threshold. If the maximum filtered oxygen sensor voltage exceeds the air-fuel ratio imbalance threshold, the ECU 14 follows a logic path 58 to a functional box 60, wherein the ECU 14 determines a rich-lean imbalance status of "non-normal". Otherwise, the rich-lean imbalance status may be determined to be "normal"—in other words, not imbalanced.

Either way, the system 12 may be configured to calculate an imbalance ratio and an accumulated imbalance ratio in functional box 62, which is used for fault reporting and which will be described in further detail below. The imbalance ratio and the accumulated imbalance ratio may be calculated after every engine cycle. The imbalance ratio is equal to the maximum value from one engine cycle of filtered oxygen sensor voltage divided by the air-fuel ratio cylinder imbalance detection threshold. The accumulated imbalance ratio is equal to the sum of all previous engine cycles of imbalance ratio plus the imbalance ratio from the current engine cycle. This may include all previous engine cycles of imbalance ratio for a current test window, and then the accumulated imbalance ratio should be reset at the beginning of a new test window.

Referring to FIGS. 4 and 5, which show rich and lean induced imbalances, it is impossible to tell whether the imbalance is rich or lean simply by comparing the voltages 36, 42 to the threshold 40. This is because the filtered voltage signal from the oxygen sensor 26 exceeds the threshold 40 for both the voltage 36 having the lean portion 4B and the voltage 42 having the rich portion 5B. The responses of the oxygen sensor voltage to a too rich or a too lean condition are similar in the frequency domain.

Figure 7:
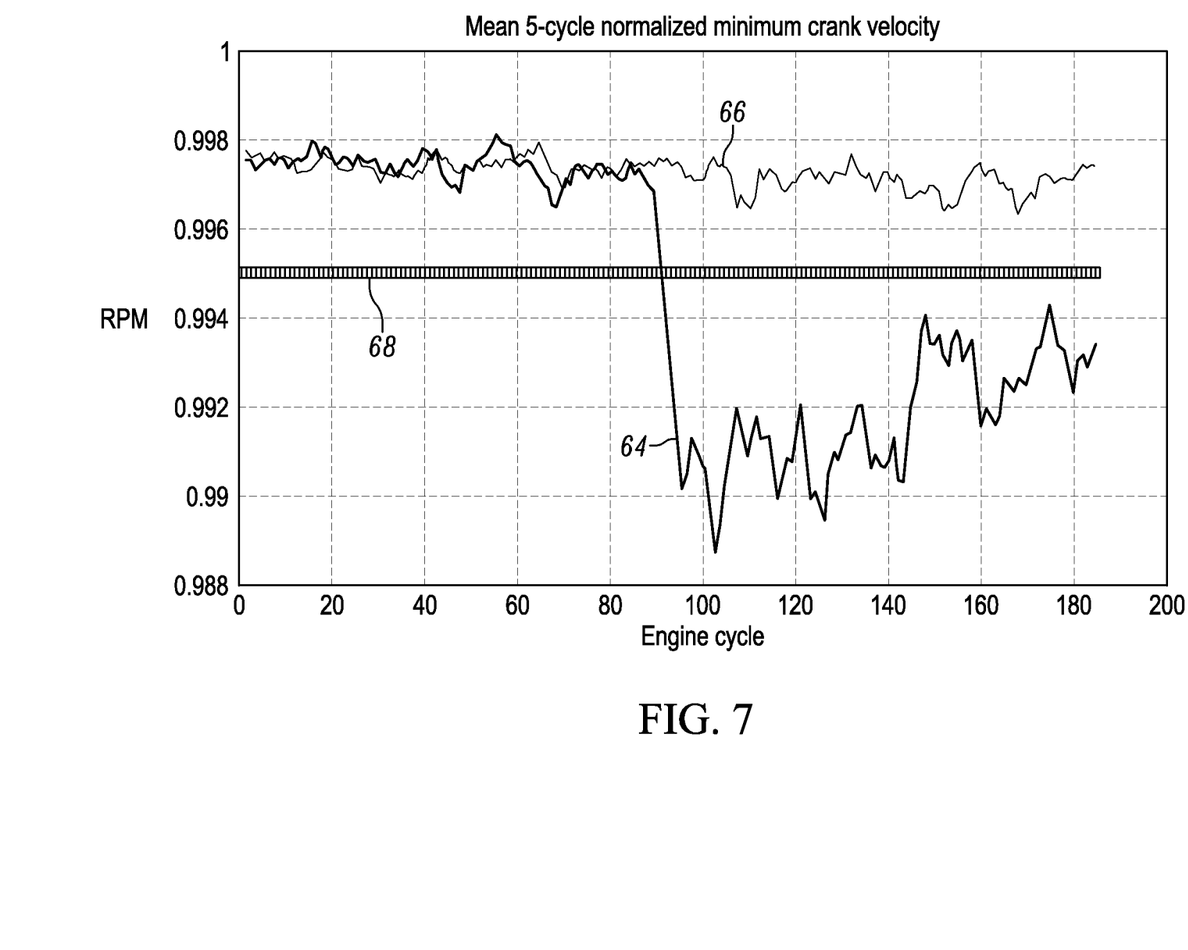
FIG. 7 is a graph illustrating normalized crank velocity profiles for two fuel mixtures over a series of cylinder firing events, wherein a lean air-fuel mixture and a rich air-fuel mixture is used after about the $90^{th}$ engine cycle, according to the principles of the present disclosure.

However, referring to FIG. 7, vehicle data shows that crank wheel velocity or engine speed respond to an air-fuel ratio rich imbalance differently than to an air-fuel ratio lean imbalance. A mean normalized minimum engine speed (or crank velocity) (defined below) for a lean-induced condition is graphed at 64 and a mean normalized engine speed (or crank velocity) (defined below) for a rich-induced condition is graphed at 66. The mean normalized engine speed (or crank velocity) 64 for the lean-induced condition is much lower than the mean normalized engine speed (or crank velocity) 66 of the rich-induced condition. Accordingly, a threshold 68 of engine speed may be determined during calibration that is between the mean normalized minimum engine speed (or crank velocity) 64 for the lean-induced condition and the mean normalized engine speed (or crank velocity) 66 for the rich-induced condition. Thus, there is a reduction in engine speed or torque-impact when the engine is running on a lean air-fuel mixture, but not for a rich air-fuel mixture. The threshold 68 may be referred to as the velocity rich/lean imbalance threshold 68 or the rich-lean imbalance engine speed threshold, by way of example.

Figure 8:
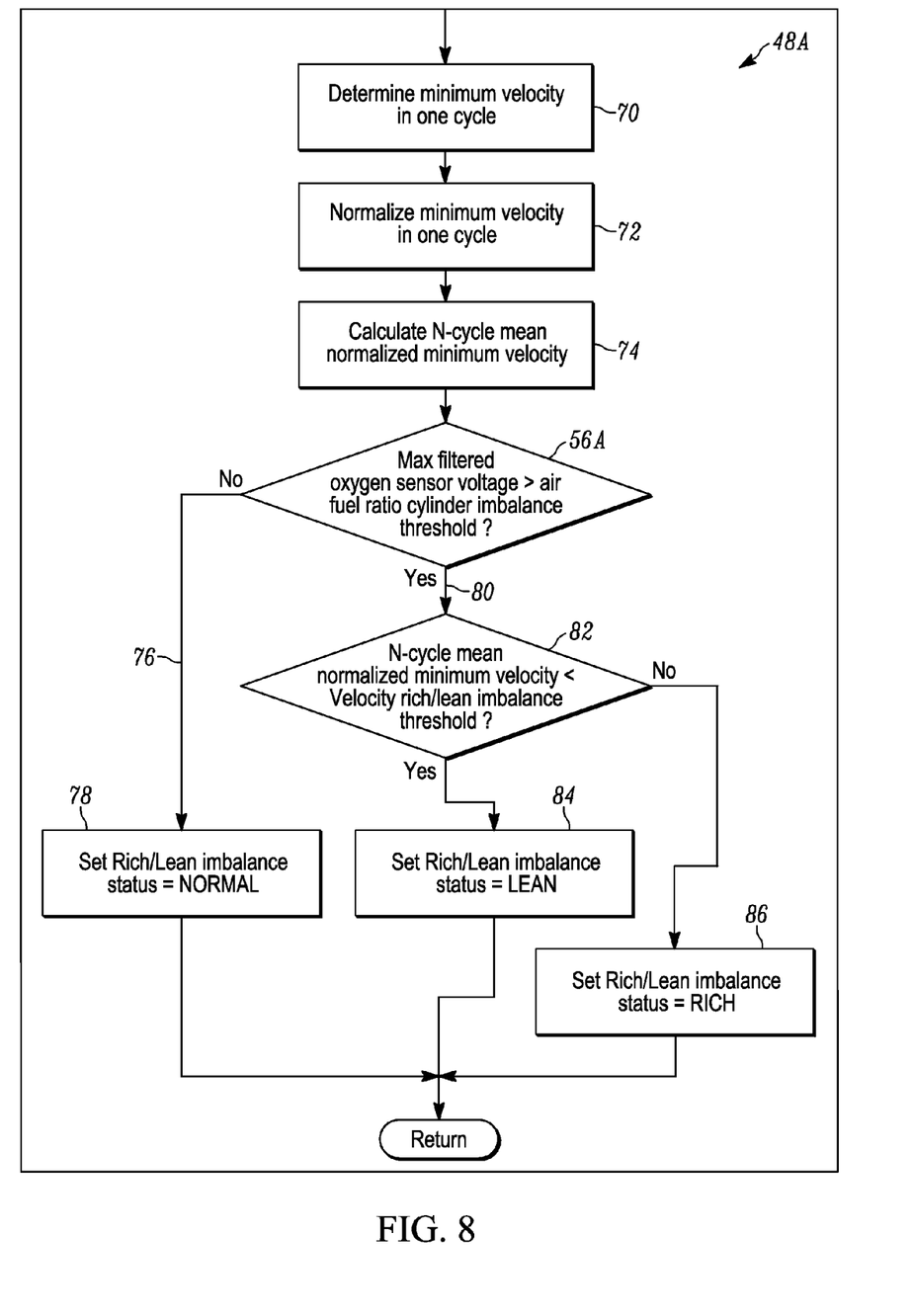
FIG. 8 is a block diagram illustrating an example of a sub-function for determining a rich-lean imbalance status, as being either lean or rich, of the system illustrated in FIG. 3, in accordance with the principles of the present disclosure.

Referring now to FIG. 8, one example 48A of how the sub-function 48 may determine rich-lean imbalance status as being either rich or lean is illustrated. The ECU 14 may have control logic to execute several steps if the rich-lean imbalance status is non-normal, in order to determine whether the status is non-normal and rich or non-normal and lean. In essence, the ECU 14 figures out whether mean normalized velocity is above or below the threshold 68, in order to determine whether the rich-lean imbalance status is non-normal and rich or non-normal and lean.

The ECU 14 may be configured to first determine the minimum velocity for one engine cycle, as illustrated in functional box 70. The minimum velocity is then normalized for that one engine cycle by dividing the minimum velocity by the mean velocity for the one engine cycle, in functional box 72. The ECU 14 may repeat steps 70 and 72 for any number of engine cycles, and calculate a calibratable cycles (N-cycle) mean normalized minimum velocity, in functional block 74. For example, the ECU may calculate the normalized minimum velocity as in step 72 for five cycles (or any desired calibratable number of cycles), and calculate the mean normalized minimum velocity from those five cycles (or N-cycles).

As explained above with reference to box 56 in FIG. 6, the ECU 14 may determine the rich-lean imbalance status by determining whether the maximum oxygen sensor filtered voltage exceeds the air-fuel imbalance detection threshold. This step is also illustrated as part of the sub-function 48A because the ECU 14 may be configured to check whether there is an imbalance before attempting to determine whether that imbalance is lean or rich. This is illustrated in functional box 56A, wherein the ECU 14 determines whether the maximum oxygen sensor filtered voltage exceeds the air-fuel imbalance detection threshold. If the maximum filtered oxygen sensor voltage does not exceed the air-fuel ratio imbalance threshold, the ECU 14 follows a logic path 76 to a functional box 78, wherein the ECU 14 determines a rich-lean imbalance status of "normal" and/or sets the rich-lean imbalance to "normal."

If, however, the ECU 14 determines that the maximum oxygen sensor filtered voltage exceeds the air-fuel imbalance detection threshold, the ECU 14 proceeds to determine whether the imbalance is rich or lean by proceeding along path 80 to functional box 82. In functional box 82, the ECU 14 is configured to determine whether the mean normalized minimum velocity is under or over the velocity rich/lean imbalance threshold, such as the velocity rich/lean imbalance threshold 68 illustrated in FIG. 7. If the maximum filtered oxygen sensor voltage is greater than the air-fuel ratio imbalance threshold and the mean normalized velocity is less than, or is not greater than, the velocity rich-lean imbalance threshold, the ECU 14 is configured to set the rich-lean imbalance status to "lean" as illustrated in functional box 84. If, however, the maximum filtered oxygen sensor voltage is greater than the air-fuel ratio imbalance threshold and the mean normalized velocity is greater than, or is not less than, the velocity rich-lean imbalance threshold, the ECU 14 is configured to set the rich-lean imbalance status to "rich" as illustrated in functional box 86. In other words, the ECU 14 then determines that the imbalance status is non-normal and lean or non-normal and rich.

Thus, the ECU 14, or other controller, may be configured to collect the oxygen sensor voltage for each engine cycle of a plurality of engine cycles over a predetermined test window. The filter 38 may be configured to create the filtered oxygen sensor voltage for each engine cycle of the plurality of engine cycles over the predetermined test window, and the ECU 14 may be further configured to determine a plurality of mean engine speeds and a plurality of minimum engine speeds for a multiple number of engine cycles of the plurality of engine cycles. The ECU 14 may be configured to calculate a normalized minimum engine speed for each of the multiple numbers of engine cycles by dividing each minimum engine speed by each corresponding mean engine speed. The ECU 14 may then be configured to calculate a mean normalized engine speed based on each normalized engine speed, and the ECU 14 may be further configured to determine a rich-lean imbalance engine speed threshold based on a stored calibration. The ECU 14 may be configured to determine whether the mean normalized minimum engine speed exceeds the rich-lean imbalance engine speed threshold, the rich-lean imbalance status being non-normal and rich if the mean normalized minimum engine speed exceeds the rich-lean imbalance engine speed threshold, and the rich-lean imbalance status being non-normal and lean if the mean normalized minimum engine speed does not exceed the rich-lean imbalance engine speed threshold.

Referring back to FIG. 3, after the cylinder imbalance module 44 is complete, the system 12 may include a fault reporting functional block 88. In the fault reporting functional block 88, the ECU 14 or other controller receives the rich-lean imbalance status and the accumulated imbalance ratio and determines whether to report that a rich or lean fault is detected.

Figure 9:
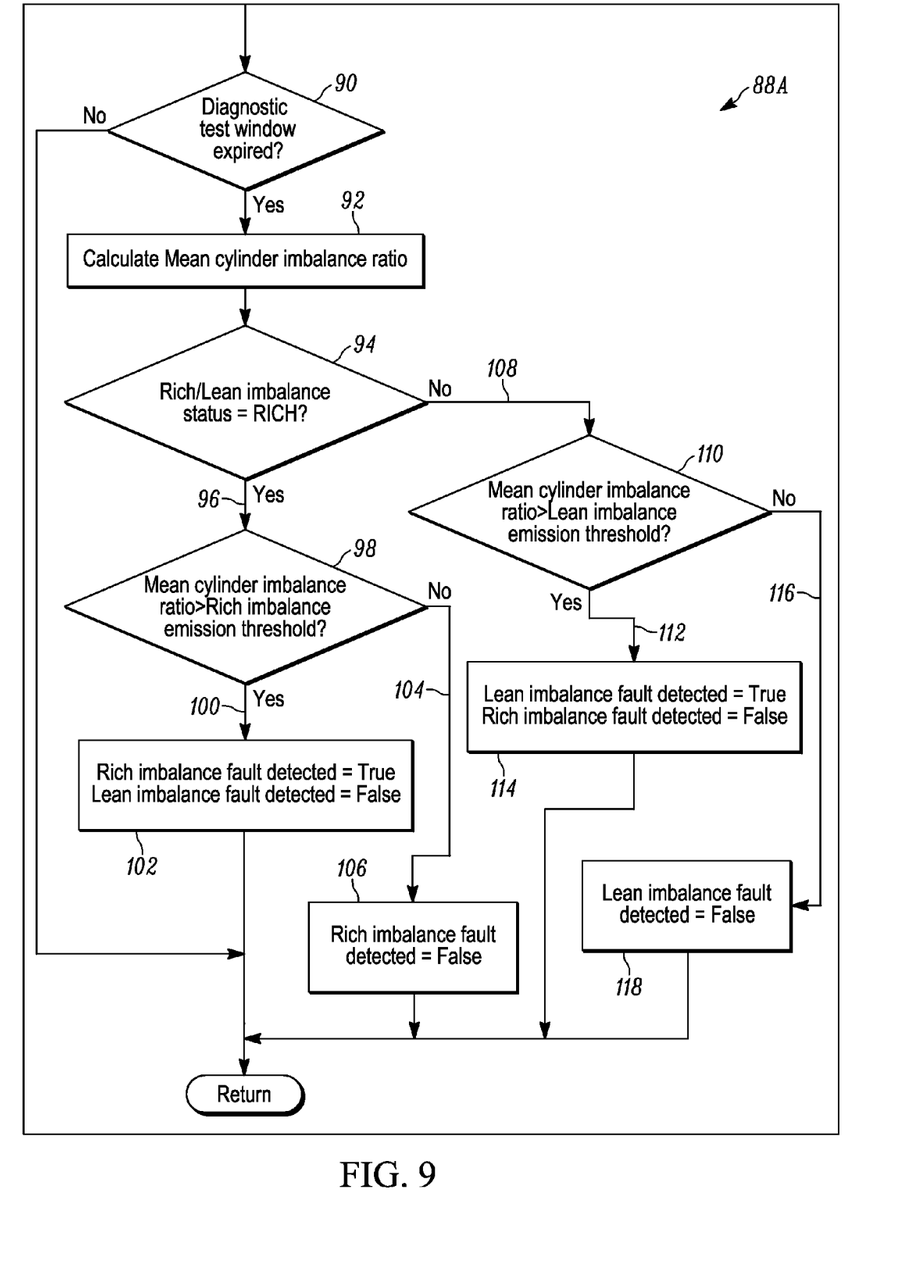
FIG. 9 is a block diagram illustrating an example of a function for fault reporting of the system illustrated in FIG. 3, according to the principles of the present disclosure.

Referring now to FIG. 9, one example 88A of a logic flowchart for fault reporting as shown in block 88 of FIG. 2 is illustrated. The ECU 14 may have control logic to execute the functional blocks or steps of FIG. 9. In functional block 90, the ECU 14 determines whether a diagnostic test window has expired. The diagnostic test window may include a plurality of engine cycles. For example, the diagnostic test window may include 750 engine cycles.

After the diagnostic test window has expired, the ECU 14 is configured to calculate the mean cylinder imbalance ratio in functional block 92. As explained above with reference to FIG. 6, the imbalance ratio is equal to the maximum value from one engine cycle of filtered oxygen sensor voltage divided by the air-fuel ratio cylinder imbalance detection threshold. The accumulated imbalance ratio is equal to the sum of all previous engine cycles within the diagnostic test window of imbalance ratios plus the imbalance ratio from the current engine cycle. In functional diagram 88A, the accumulated imbalance ratio would include the imbalance ratio for all engine cycles in the diagnostic test window. The mean cylinder imbalance ratio, calculated in box 92, is the accumulated imbalance ratio divided by the number of engine cycles in the diagnostic test window.

The ECU 14 may then determine in functional box 94 whether the rich/lean imbalance is rich. (In the alternative, the query could ask whether the rich/lean imbalance is lean). This determination may be made in accordance with the process illustrated in FIG. 8 or in any suitable manner. If the ECU 14 determines that the rich-lean imbalance status is rich, the system 12 follows a path 96 to a functional block 98, wherein the ECU 14 determines whether the mean cylinder imbalance ratio is greater than a rich imbalance emission threshold.

If the ECU 14 determines that the mean cylinder imbalance ratio is greater than the rich imbalance emission threshold, the system 12 follows a path 100 to a functional block 102, wherein the ECU 14 sets a rich imbalance fault detected status to TRUE (or other positive identifier) and the ECU 14 sets a lean imbalance fault detected status to FALSE (or other negative identifier). If the ECU 14 determines that the mean cylinder imbalance ratio is not greater than the rich imbalance emission threshold, the system 12 follows a path 104 to a functional block 106, wherein the ECU 14 sets a rich imbalance fault detected status to FALSE (or other negative identifier).

Referring back to functional block 94, if the ECU 14 determines that the rich-lean imbalance status is not rich, the system 12 follows a path 108 to a functional block 110, wherein the ECU 14 determines whether the mean cylinder imbalance ratio is greater than a lean imbalance emission threshold. If the ECU 14 determines that the mean cylinder imbalance ratio is greater than the lean imbalance emission threshold, the system 12 follows a path 112 to a functional block 114, wherein the ECU 14 sets a lean imbalance fault detected status to TRUE (or other positive identifier) and the ECU 14 sets a rich imbalance fault detected status to FALSE (or other negative identifier). If the ECU 14 determines that the mean cylinder imbalance ratio is not greater than the lean imbalance emission threshold, the system 12 follows a path 116 to a functional block 118, wherein the ECU 14 sets a lean imbalance fault detected status to FALSE (or other negative identifier).

The status for lean imbalance fault detected and rich imbalance fault detected may be determined by the rich/lean imbalance status, as determined in functional block 44 of FIG. 2 and/or 46A of FIG. 6 and/or 48A of FIG. 8, a rich imbalance emission threshold (set during calibration, for example), and a lean imbalance emission threshold (also set during calibration, for example). Air-fuel ratio cylinder imbalance fault reporting may be executed every engine cycle, by way of example.

Thus, the ECU 14, or other controller may be configured to determine a plurality of imbalance ratios over the predetermined test window, each imbalance ratio being a maximum oxygen sensor filtered voltage divided by an air-fuel ratio imbalance detection threshold for a single engine cycle of the plurality of engine cycles over the predetermined test window. The ECU 14 may be further configured to calculate an accumulated imbalance ratio, the accumulated imbalance ratio including the sum of the plurality of imbalance ratios over the number of engine cycles in the predetermined test window (e.g., the number of samples collected in the test window). The ECU 14 may be configured to calculate a mean cylinder imbalance ratio, the mean cylinder imbalance ratio being the accumulated imbalance ratio divided by the predetermined test window. The ECU 14 may then be configured to report a rich imbalance fault detection status if the mean cylinder imbalance ratio exceeds a rich imbalance emission threshold, the ECU 14 being configured to report a lean imbalance fault detection status if the mean cylinder imbalance ratio exceeds a lean imbalance emission threshold. The ECU 14 may include a plurality of control logics to complete these steps.

Use of the mean cylinder imbalance ratio to determine imbalance fault eliminates the requirement for a fail counter and a de-bounce counter. Accordingly, in some variations, the system 12 may be provided without a fail counter or function and/or a de-bounce counter or function.

Figure 10:
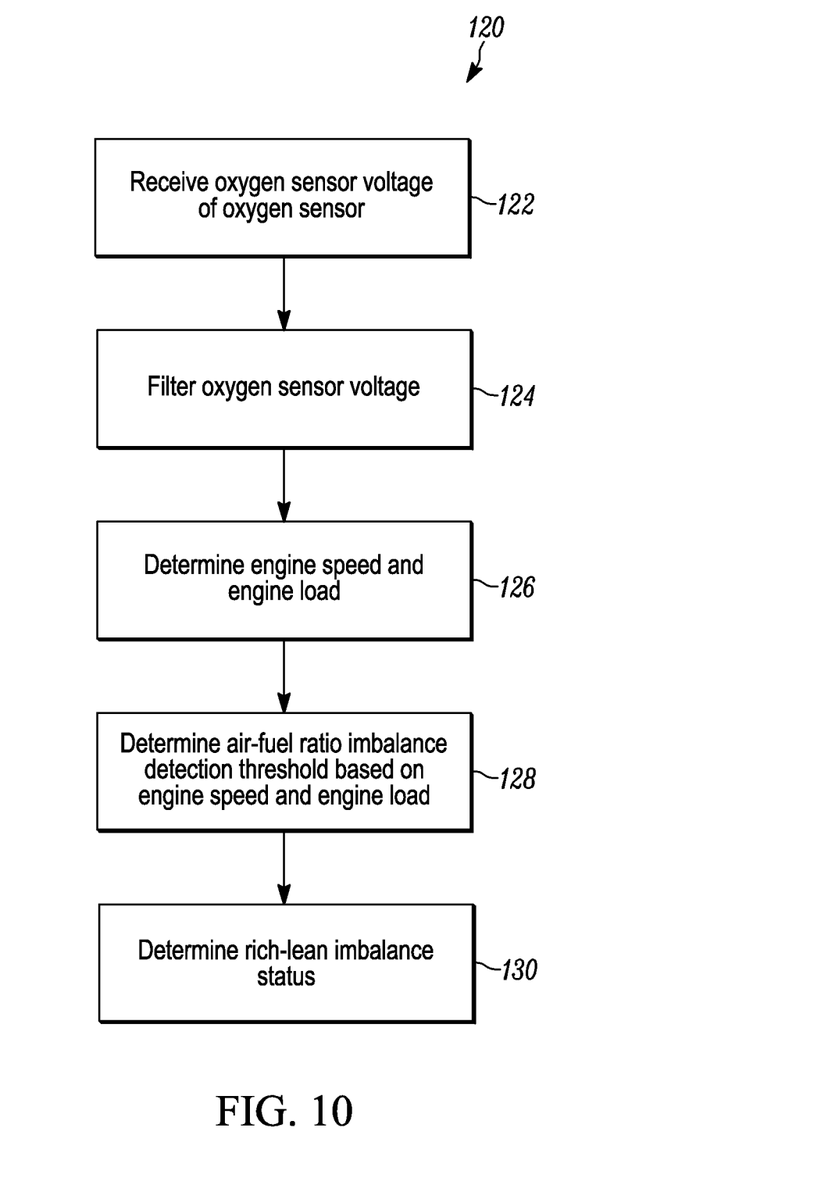
FIG. 10 is a block diagram illustrating a method for detecting air-fuel ratio rich-lean imbalance in an automotive engine cylinder, in accordance with the principles of the present disclosure.

Referring now to FIG. 10, a method for detecting air-fuel ratio rich-lean imbalance in an automotive engine cylinder is schematically illustrated and generally designated at 120. The method 120 may be executed by the ECU 14 and associated components, such as the filter 38, by another controller, or in any other suitable manner. The method 120 may be performed by the system 12 and ECU 14 explained above and with the details explained above, if desired.

The method 120 includes a step 122 of receiving an oxygen sensor voltage of an oxygen sensor. The method 120 then includes a step 124 of filtering the oxygen sensor voltage to create a filtered oxygen sensor voltage. The method 120 also includes a step 126 of determining an engine speed and an engine load, and a step 128 of determining an air-fuel ratio imbalance detection threshold based on the engine speed and the engine load.

The method 120 may then include a step 130 of determining a rich-lean imbalance status. The step 130 may include determining that the rich-lean imbalance status is non-normal if any portion of the filtered oxygen sensor voltage exceeds the air-fuel ratio imbalance detection threshold and determining that the rich-lean imbalance status is normal if none of the filtered oxygen sensor voltage exceeds the air-fuel ratio imbalance detection threshold.

In some variations, the step 130 of determining the rich-lean imbalance status may include determining a maximum oxygen sensor filtered voltage from the filtered oxygen sensor voltage and determining whether the maximum oxygen sensor filtered voltage exceeds the air-fuel imbalance detection threshold.

In some variations, the step 122 of receiving the oxygen sensor voltage of the oxygen sensor may include collecting the oxygen sensor voltage for a single engine cycle. The step 124 of filtering the oxygen sensor voltage to create the filtered oxygen sensor voltage may include creating a filtered oxygen sensor voltage for the single engine cycle. Furthermore, the step 124 of filtering the oxygen sensor voltage to create the filtered oxygen sensor voltage may include filtering with an order based filtering technique, such as the filter 38 described above.

In some variations, if the rich-lean imbalance status is non-normal, the method 120 may also include a step of determining a minimum engine speed for the single engine cycle, and the method 120 may further include determining a rich-lean imbalance engine speed threshold. The method 120 may then include determining whether the minimum engine speed exceeds the rich-lean imbalance engine speed threshold, wherein, in step 130, the rich-lean imbalance is determined to be non-normal and rich if the minimum engine speed exceeds the rich-lean imbalance engine speed threshold and the rich-lean imbalance status is determined to be non-normal and lean if the minimum engine speed does not exceed the rich-lean imbalance engine speed threshold.

In some variations, if the rich-lean imbalance status is non-normal, the method 120 may also include a step of determining a mean engine speed and a minimum engine speed for the single engine cycle. The method may then include a step of calculating a normalized minimum engine speed by dividing the minimum engine speed by the mean engine speed. The method 120 may further include a step of determining a rich-lean imbalance engine speed threshold, and the method 120 may further include a step of determining whether the normalized minimum engine speed exceeds the rich-lean imbalance engine speed threshold, wherein, in step 130, the rich-lean imbalance status is determined to be non-normal and rich if the normalized minimum engine speed exceeds the rich-lean imbalance engine speed threshold and the rich-lean imbalance status is determined to be non-normal and lean if the normalized minimum engine speed does not exceed the rich-lean imbalance engine speed threshold.

In some variations, if the rich-lean imbalance status is non-normal, the method 120 may include a step of determining a plurality of mean engine speeds and a plurality of minimum engine speeds for a multiple number of engine cycles, and the method 120 may further include calculating a normalized minimum engine speed for each of the engine cycles of the multiple number of engine cycles by dividing each minimum engine speed by each mean engine speed for each engine cycle. The method 120 may then include calculating a mean normalized minimum engine speed based on each normalized engine speed. The method 120 may also include a step of determining a rich-lean imbalance engine speed threshold. The method 120 may further include determining whether the mean normalized minimum engine speed exceeds the rich-lean imbalance engine speed threshold, and in step 130, the method 120 may include determining that the rich-lean imbalance status is non-normal and rich if the mean normalized minimum engine speed exceeds the rich-lean imbalance engine speed threshold and determining that the rich-lean imbalance status is non-normal and lean if the mean normalized minimum engine speed does not exceed the rich-lean imbalance engine speed threshold.

In some variations, the method 120 may include a step of determining an imbalance ratio. The imbalance ratio may be the maximum oxygen sensor filtered voltage divided by the air-fuel ratio imbalance detection threshold for the single engine cycle, as explained above. The method 120 may include determining a plurality of imbalance ratios, wherein each imbalance ratio is a maximum oxygen sensor filtered voltage divided by an air-fuel ratio imbalance detection threshold for a single engine cycle of a plurality of engine cycles. The method 120 may also include a step of calculating an accumulated imbalance ratio, wherein the accumulated imbalance ratio includes the sum of the plurality of imbalance ratios. The plurality of engine cycles may include each engine cycle for a predetermined test window. Thus, the accumulated imbalance ratio may include the sum of the imbalance ratios for the predetermined test window. The accumulated imbalance ratio should be reset at the beginning of a new test window.

The method 120 may also include a step of calculating a mean cylinder imbalance ratio, the mean cylinder imbalance ratio being the accumulated imbalance ratio divided by the number of imbalance ratios calculated in the predetermined test window. The method 120 may also include a step of reporting a rich imbalance fault detection status if the mean cylinder imbalance ratio exceeds a rich imbalance emission threshold and a step of reporting a lean imbalance fault detection status if the mean cylinder imbalance ratio exceeds a lean imbalance emission threshold. For example, the block diagram of FIG. 9 may be used to accomplish these steps.

While the terms "normal," "non-normal," "TRUE," "FALSE," "rich," and "lean" are used herein to describe the rich/lean imbalance status, it should be understood that any other words with similar meaning could be used, or any other code words without similar meaning could be used, or no words could be used at all and the system 12 or method 120 could simply take action based on the results without associating a certain word with the action.

It is further understood that any of the above described concepts can be used alone or in combination with any or all of the other above described concepts. As a person skilled in the art will readily appreciate, the above description is meant as one illustration of the principles of the invention. This description is not intended to limit the scope or application of the invention in that the invention is susceptible to modification, variation, and change, without departing from the spirit and scope of the invention, as defined in the following claims.

What is claimed is:

1. A method for detecting air-fuel ratio rich-lean imbalance in an automotive engine cylinder, the method comprising:
   receiving an oxygen sensor voltage of an oxygen sensor;
   filtering the oxygen sensor voltage to create a filtered oxygen sensor voltage;
   determining an engine speed and an engine load;
   determining an air-fuel ratio imbalance detection threshold, based on the engine speed and the engine load; and
   determining a rich-lean imbalance status, the rich-lean imbalance status being non-normal if any portion of the filtered oxygen sensor voltage exceeds the air-fuel ratio imbalance detection threshold, the rich-lean imbalance status being normal if none of the filtered oxygen sensor voltage exceeds the air-fuel ratio imbalance detection threshold.

2. The method of claim 1, further comprising determining a maximum oxygen sensor filtered voltage from the filtered oxygen sensor voltage, wherein the step of determining a rich-lean imbalance status comprises determining whether the maximum oxygen sensor filtered voltage exceeds the air-fuel imbalance detection threshold.

3. The method of claim 2, wherein the step of receiving an oxygen sensor voltage of an oxygen sensor comprises collecting the oxygen sensor voltage for a single engine cycle, and the step of filtering the oxygen sensor voltage to create a filtered oxygen sensor voltage comprises creating a filtered oxygen sensor voltage for the single engine cycle.

4. The method of claim 3, if the rich-lean imbalance status is non-normal, the method further comprising determining a minimum engine speed for the single engine cycle, the method further comprising determining a rich-lean imbalance engine speed threshold, and the method further comprising determining whether the minimum engine speed exceeds the rich-lean imbalance engine speed threshold, the rich-lean imbalance status being non-normal and rich if the minimum engine speed exceeds the rich-lean imbalance engine speed threshold, the rich-lean imbalance status being non-normal and lean if the minimum engine speed does not exceed the rich-lean imbalance engine speed threshold.

5. The method of claim 3, if the rich-lean imbalance status is non-normal, the method further comprising determining a mean engine speed and a minimum engine speed for the single engine cycle, the method further comprising calculating a normalized minimum engine speed by dividing the minimum engine speed by the mean engine speed, the method further comprising determining a rich-lean imbalance engine speed threshold, and the method further comprising determining whether the normalized minimum engine speed exceeds the rich-lean imbalance engine speed threshold, the rich-lean imbalance status being non-normal and rich if the normalized minimum engine speed exceeds the rich-lean imbalance engine speed threshold, the rich-lean imbalance status being non-normal and lean if the normalized minimum engine speed does not exceed the rich-lean imbalance engine speed threshold.

6. The method of claim 5, further comprising determining an imbalance ratio, the imbalance ratio being the maximum oxygen sensor filtered voltage divided by the air-fuel ratio imbalance detection threshold for the single engine cycle.

7. The method of claim 3, if the rich-lean imbalance status is non-normal, the method further comprising determining a plurality of mean engine speeds and a plurality of minimum engine speeds for a multiple number of engine cycles, the method further comprising calculating a normalized minimum engine speed for each of the engine cycles of the multiple number of engine cycles by dividing each minimum engine speed by each mean engine speed for each engine cycle, the method further comprising calculating a mean normalized minimum engine speed based on each normalized minimum engine speed, the method further comprising determining a rich-lean imbalance engine speed threshold, and the method further comprising determining whether the mean normalized minimum engine speed exceeds the rich-lean imbalance engine speed threshold, the rich-lean imbalance status being non-normal and rich if the mean normalized minimum engine speed exceeds the rich-lean imbalance engine speed threshold, the rich-lean imbalance status being non-normal and lean if the mean normalized minimum engine speed does not exceed the rich-lean imbalance engine speed threshold.

8. The method of claim 7, further comprising determining a plurality of imbalance ratios, each imbalance ratio being a maximum oxygen sensor filtered voltage divided by an air-fuel ratio imbalance detection threshold for a single engine cycle of a plurality of engine cycles, the method further comprising calculating an accumulated imbalance ratio, the accumulated imbalance ratio including the sum of the plurality of imbalance ratios.

9. The method of claim 8, wherein the plurality of engine cycles includes each engine cycle in a predetermined test window, the accumulated imbalance ratio including the sum of the imbalance ratios in the predetermined test window, the method further comprising calculating a mean cylinder imbalance ratio, the mean cylinder imbalance ratio being the accumulated imbalance ratio divided by number of the imbalance ratios in the predetermined test window.

10. The method of claim 9, further comprising reporting a rich imbalance fault detection status if the mean cylinder imbalance ratio exceeds a rich imbalance emission threshold, the method further comprising reporting a lean imbalance fault detection status if the mean cylinder imbalance ratio exceeds a lean imbalance emission threshold.

11. The method of claim 1, wherein the step of filtering the oxygen sensor voltage to create the filtered oxygen sensor voltage includes filtering with an order based filtering technique.

12. An engine control unit configured to detect an air-fuel ratio rich-lean imbalance in an automotive engine cylinder, the engine control unit comprising:
  a first control logic configured to receive an oxygen sensor voltage of an oxygen sensor;
  a second control logic configured to filter the oxygen sensor voltage to create a filtered oxygen sensor voltage;
  a third control logic configured to determine an engine speed and an engine load;
  a fourth control logic configured to determine an air-fuel ratio imbalance detection threshold, based on the engine speed and the engine load; and
  a fifth control logic configured to determine a rich-lean imbalance status, the rich-lean imbalance status being non-normal if any portion of the filtered oxygen sensor voltage exceeds the air-fuel ratio imbalance detection threshold, the rich-lean imbalance status being normal if none of the filtered oxygen sensor voltage exceeds the air-fuel ratio imbalance detection threshold.

13. The engine control unit of claim 12, wherein the second control logic is configured to employ an order based filtering technique to filter the oxygen sensor voltage.

14. The engine control unit of claim 13, further comprising a sixth control logic configured to determine a maximum oxygen sensor filtered voltage from the filtered oxygen sensor voltage, wherein the fifth control logic is configured to determine whether the maximum oxygen sensor filtered voltage exceeds the air-fuel imbalance detection threshold.

15. The engine control unit of claim 14, wherein the first control logic is configured to collect the oxygen sensor voltage for a single engine cycle, the second control logic being configured to create the filtered oxygen sensor voltage for the single engine cycle, the engine control unit further comprising a seventh control logic configured to execute the following steps if the rich-lean imbalance status is non-normal:
  determine a plurality of mean engine speeds and a plurality of minimum engine speeds for a multiple number of engine cycles;
  calculate a normalized minimum engine speed for each of the engine cycles of the multiple number of engine cycles by dividing each minimum engine speed by each mean engine speed for each engine cycle of the multiple number of engine cycles;
  calculate a mean normalized minimum engine speed based on each normalized minimum engine speed;
  determine a rich-lean imbalance engine speed threshold; and
  determine whether the mean normalized minimum engine speed exceeds the rich-lean imbalance engine speed threshold, the rich-lean imbalance status being non-normal and rich if the mean normalized minimum engine speed exceeds the rich-lean imbalance engine speed threshold, the rich-lean imbalance status being non-normal and lean if the mean normalized minimum engine speed does not exceed the rich-lean imbalance engine speed threshold.

16. The engine control unit of claim 15, further comprising:
  an eighth control logic configured to determine a plurality of imbalance ratios for a plurality of engine cycles over a predetermined test window, each imbalance ratio being a maximum oxygen sensor filtered voltage divided by an air-fuel ratio imbalance detection threshold for a single engine cycle of the plurality of engine cycles over the predetermined test window;
  a ninth control logic configured to calculate an accumulated imbalance ratio, the accumulated imbalance ratio including the sum of the plurality of imbalance ratios over the predetermined test window;
  a tenth control logic configured to calculate a mean cylinder imbalance ratio, the mean cylinder imbalance ratio being the accumulated imbalance ratio divided by the number of the imbalance ratios in the predetermined test window; and
  an eleventh control logic configured to report a rich imbalance fault detection status if the mean cylinder imbalance ratio exceeds a rich imbalance emission threshold and to report a lean imbalance fault detection status if the mean cylinder imbalance ratio exceeds a lean imbalance emission threshold.

17. A system for detecting air-fuel ratio rich-lean imbalance in an automotive engine cylinder, the system comprising:
  an oxygen sensor;
  a controller configured to receive an oxygen sensor voltage of the oxygen sensor; and
  an order based filter configured to filter the oxygen sensor voltage to create a filtered oxygen sensor voltage,
  wherein the controller is configured to receive the filtered oxygen sensor voltage from the filter, the controller being configured to determine an air-fuel ratio imbalance detection threshold based on an engine speed and an engine load, the controller being configured to determine a rich-lean imbalance status, the rich-lean imbalance status being non-normal if any portion of the filtered oxygen sensor voltage exceeds the air-fuel ratio imbalance detection threshold, the rich-lean imbalance status being normal if none of the filtered oxygen sensor voltage exceeds the air-fuel ratio imbalance detection threshold.

18. The system of claim 17, the controller being further configured to determine a maximum oxygen sensor filtered voltage from the filtered oxygen sensor voltage, the controller being configured to determine the rich-lean imbalance status by determining whether the maximum oxygen sensor filtered voltage exceeds the air-fuel imbalance detection threshold.

19. The system of claim 18, the controller being further configured to collect the oxygen sensor voltage for each engine cycle of a plurality of engine cycles over a predetermined test window, the filter being configured to create the filtered oxygen sensor voltage for each engine cycle of the plurality of engine cycles over the predetermined test window, the controller being further configured to determine a plurality of mean engine speeds and a plurality of minimum engine speeds for a multiple number of engine cycles of the plurality of engine cycles, the controller being further configured to calculate a normalized minimum engine speed for each of the multiple number of engine cycles by dividing each minimum engine speed by each corresponding mean engine speed of the multiple number of engine cycles, the controller being further configured to calculate a mean normalized minimum engine speed based on each normalized minimum engine speed, the controller being further configured to determine a rich-lean imbalance engine speed threshold, and the controller being further configured to determine whether the mean normalized minimum engine speed exceeds the rich-lean imbalance engine speed threshold, the rich-lean imbalance status being non-normal and rich if the mean normalized minimum engine speed exceeds the rich-lean imbalance engine speed threshold, the rich-lean imbalance status being non-normal and lean if the mean normalized minimum engine speed does not exceed the rich-lean imbalance engine speed threshold.

20. The system of claim 19, the controller being further configured to determine a plurality of imbalance ratios over the predetermined test window, each imbalance ratio being a maximum oxygen sensor filtered voltage divided by an air-fuel ratio imbalance detection threshold for a single engine cycle of the plurality of engine cycles over the predetermined test window, the controller being further configured to calculate an accumulated imbalance ratio, the accumulated imbalance ratio including the sum of the plurality of imbalance ratios over the predetermined test window, the controller being further configured to calculate a mean cylinder imbalance ratio, the mean cylinder imbalance ratio being the accumulated imbalance ratio divided by the number of the imbalance ratios in the predetermined test window, the controller being configured to report a rich imbalance fault detection status if the mean cylinder imbalance ratio exceeds a rich imbalance emission threshold, the controller being configured to report a lean imbalance fault detection status if the mean cylinder imbalance ratio exceeds a lean imbalance emission threshold.

\* \* \* \* \*